United States Patent [19]

Neveu et al.

[11] Patent Number: 5,048,228

[45] Date of Patent: Sep. 17, 1991

[54] COMPOSITE AGROTEXTILE AND ITS APPLICATIONS

[75] Inventors: Jean L. Neveu; Philippe Gregoire, both of Colmar, France

[73] Assignee: Holzstoff Holding S.A., Basel, Switzerland

[21] Appl. No.: 376,027

[22] Filed: Jul. 6, 1989

[30] Foreign Application Priority Data

Jul. 7, 1988 [FR] France .................. 88 09240

[51] Int. Cl.$^5$ .............................................. A01G 7/00
[52] U.S. Cl. ............................................ 47/9; 47/26; 47/29
[58] Field of Search ................. 47/9, 26, 28.1, 29, 47/31, 32, 9; 52/2 N, 2 P, 3

[56] References Cited

U.S. PATENT DOCUMENTS

| | | | |
|---|---|---|---|
| 3,701,241 | 10/1972 | Zuckerman | 47/26 X |
| 3,769,747 | 11/1973 | Chapman | 47/9 X |
| 3,826,876 | 1/1975 | Graves | 47/9 X |
| 3,929,178 | 12/1975 | Hickey | 52/2 N |
| 3,955,319 | 5/1976 | Smith | 47/9 |
| 3,975,859 | 8/1976 | Müller | 47/9 X |
| 4,044,501 | 8/1977 | Frydryk | 47/26 |
| 4,122,637 | 10/1978 | Range | 52/3 |
| 4,798,023 | 1/1989 | Morssinkhof | 47/26 |
| 4,856,228 | 8/1989 | Robinson | 47/29 |

FOREIGN PATENT DOCUMENTS 2598881 11/1987 France .................. 47/26

Primary Examiner—Henry E. Raduazo
Attorney, Agent, or Firm—Wenderoth, Lind & Ponack

[57] ABSTRACT

The agrotextile comprises a porous sheet (1), permeable to air and water and equipped in the direction of its longest dimension with added side strips (2, 3) intended to be buried in the soil for fastening the whole to the ground. The sheet is of woven, knitted or nonwoven structure, while the side strips are made of a sheet of flexible and smooth plastic, of closed structure, which does not adhere to the earth. Applications as a protective or forcing cover, as mulch and as a blanching sheet.

12 Claims, 5 Drawing Sheets

COMPOSITE AGROTEXTILE AND ITS APPLICATIONS

Agrotextiles is a name given to textiles for applications in agriculture or in horticulture. The development of these textiles is due in a large measure to their special properties: permeability to air, to water, to chemical treatments, thermal insulation effect, greenhouse effect due to filtering of infrared radiations, high mechanical strength properties for a relative lightness, barrier properties, and the like. An account of the subject and the bibliographic references will be found in J. J. Gerst, "Cultures légumières sous bâches", publ. Centre technique interprofessionnel des fruits et légumes Ctifl, Paris 1985 (1) and O. S. Wells and J. B. Loy, Proceedings of the Nineteenth National Agricultural Plastics Congress, Peoria (IL/USA) 1986, publ. Walter E. Splittstoesser, pages 4–9 (2).

These agrotextiles can be employed in order to fulfill various functions, especially
as forcing and protecting films (flat covers),
as mulching: protection against weeds,
as blanching sheets, and the like.

U.S. Pat. No. 3,975,859, for example, describes a sheet serving as a film for protecting plants, which comprises a multitude of parallel lengthwise slits; these slits, short and very close to each other, impart a lateral elasticity to the sheet and thus allow it to expand laterally, merely by opening the slits, and the corresponding lifting up as the plants grow and develop. In addition, the slits ensure the gas and moisture exchanges between the surrounding atmosphere and the volume of air covered by the agrotextile.

A satisfactory fastening to the ground obviously constitutes one of the conditions required for the agrotextiles to fulfill the function assigned to them. In the case of the majority of the abovementioned applications, the agrotextiles are placed directly on the ground, their lengthwise edges being buried in the soil to ensure fastening to the ground (loc. cit. 1, page 74; U.S. Pat. No. 3,975,859).

This method of fastening is carried out without the use of any element other than the agrotextile itself and the soil; it is therefore particularly economical and easy to apply. Its use is general in Europe and it is also widely employed in the United States.

However, burying the edges of the agrotextiles involves a certain number of disadvantages, namely a reduction in the surface area which can be employed, but especially the embrittlement of the sheet: because of the moisture resulting from rainfall or merely from dew, the soil becomes more and more deeply encrusted into the perforated structure of the sheet and the anchorage to the ground thus obtained causes ruptures during the removal (dismantling), and this rules out a reuse of the sheet. The fragments which could be recovered could not, furthermore, be employed, both because of their insufficient and nonuniform surface area and because of the lack of porosity resulting from the soil encrustation. Furthermore, the insufficient elasticity of agrotextiles leads to difficulties when they are placed in position using mechanized means.

These disadvantages have led, especially in the United States, to the use of other means for fastening agrotextiles to the ground. Thus, U.S. Pat. Nos. 3,769,747 and 4,044,501 are aimed at providing a fastening to the ground which is sufficiently robust to prevent tears which could be caused by sudden wind gusts or violent rainfall. To this end, the edges of the sheet are strengthened, on the one hand, by superposition of one or more layers of the same material, which is obtained, for example, by folding the edges onto themselves and, on the other hand, by addition on the edges, of a thickness which is thus doubled or multiplied, of flexible strengthening strips. The strengthened edges are pierced with holes intended to receive pegs or hooks which will be driven into the ground to produce the fastening.

This other fastening method itself also has disadvantages which cannot be overlooked. First of all, however accurate the spacing of the holes provided for the pegs, positioning of the pegs can only be done manually because of unevenness of the ground; placing and removal of the agrotextile require, therefore, the use of considerable manpower. In addition, the complex structure of the sheet edges can be produced only by a series of manual operations or, at best, by the use of several machines (superposition, attachment, perforation).

Now, the present invention provides an agrotextile which can be not only manufactured, but also laid and removed by mechanized means, that is to say practically without using manpower, which is suitable for at least a second application to the terrain and whose fastening to the ground is performed in the most economical way possible, merely by burying the edges in the soil, without introducing pegs or reinforcements.

This set of advantageous properties is obtained by the combination of two materials of fundamentally different structure. They involve, on the one hand, an elementary lightweight sheet, porous and permeable, intended to create a microclimate under it and to protect plants against vagaries of climate and insects, as well as against the entry of weeds. This sheet is combined with side strips intended to be buried in the ground, but whose closed structure and smooth surface resist encrustation of soil and hence a durable anchorage and thus permit the sheet to be readily removed, without tearing, after a first use.

The present invention consists, therefore, of a composite agrotextile which comprises, on the one hand, an elementary porous sheet (1), permeable to air and water, of woven, knitted or nonwoven structure and generally having the shape of an elongate rectangle and, on the other hand, added side strips (2, 3), joined to the sheet at least in the direction of its longest dimension and intended to be buried in the soil (4) to ensure the fastening of the said sheet to the ground, these side strips being produced from a flexible and smooth sheet of plastic, of closed structure, capable of a considerable elongation, greater than that of the sheet, and whose structure and surface state do not cause the soil to adhere or to be encrusted. The agrotextile according to the invention may also comprise a side strip at each end in the direction of the short dimension.

This combination of two different materials, which had never been attempted or proposed until now, should have, in fact, appeared impracticable or at least highly problematical to a person skilled in the art, given the different physical properties of the two materials and their juxtaposition along the line joining both materials.

The elementary sheet is capable of only a relatively small elongation, in general less than 80%, in contrast to that of which the side strips are capable; consequently, despite its high porosity, it offers no or little purchase to the wind. The side strips, on the other hand, are capable of a considerable elongation, which should have given rise to concern with distortions and deformations, or even ruptures along the joining line, during the laying and the removal of the composite.

To the surprise of the inventors, however, the new agrotextile has shown itself to be stable in its shape during the laying and the removal, and the product recovered is clean, free from soil, and is suitable for a second use without more ado. In addition, when laid by a machine, the juxtaposition of products of different properties (elongation) makes it easy to lay the elementary sheet loosely or stretched and to lay the side strips stretched, and this could not have been envisaged a priori.

Depending on the envisaged applications (floating cover, mulching, tunnel, and the like), the elementary sheet can be selected among the various available structures, be they woven, knitted or nonwoven (loc. cit. 1, page 31).

The added strips, intended to be buried, will be made from a special material whose feature is that it has an adhesion to soil which is lower than that of the elementary sheet and/or mechanical properties (for example elongation at break) which are preferably superior to those of the sheet and can range from 100% to more than 700% such as, for example, 160% elongation in the machine direction and 380% in the transverse direction.

These special properties of lower adhesion are linked with the structure and/or the surface state and/or the nature of the material employed; the latter may consist of a flexible, smooth plastic sheet (polypropylene, polyethylene, and the like), of a nonwoven with a closed structure obtained, for example, by means of a deformation with heating under stress (calendering), or of any other material limiting "sticking" of the soil to its surface.

The added strips of the composite agrotextile forming the subject of the present invention are buried in the ground and covered with soil either manually or by mechanical means, especially from a reel on a tractor or an unwinding device. During the positioning and the removal, mechanical stresses are applied particularly to these strong added strips and not to the elementary sheet. This increases the possibilities of reutilization, especially in the case of mechanical laying and removal.

In a preferred embodiment of the invention, the elementary sheet consists of a nonwoven sheet (P. W. Shipp and P. C. Kohm, loc. cit. 2, pages 51-59) made up of continuous filaments of a thermoplastic polymer (polyolefin, especially polypropylene, polyester and the like), obtained by direct spinning (spunbond process). The cohesion of the sheet is produced by various means, either physical (heat-bonding), chemical (application of a latex) or mechanical (needle-bonding) means or by a combination of these means. The cohesion or bonding provided by heat-bonding (spot calendering) is a preferred embodiment.

The elementary sheet may consist of a single sheet, of a composite, sandwich or laminated material, or of the combination of two or more sheets with different characteristics. A composite sandwich material means a composite comprising at least three superposed components, for example a spunbond nonwoven sheet, a strengthening grid and a second sheet made of spunbond nonwoven or made of a heat-bonded product consisting of short fibers. A laminated composite material means a composite formed by superposition of two or more sheets which are identical or of different nature or structure. The weight of the elementary sheets is preferably between 5 and 200 g/m$^2$. They are preferably made up of continuous filaments whose count is between 1 and 50 dtex; it is advantageously between 3 and 10 dtex.

The added strips may be plastic films, more precisely based on thermoplastic polymers, especially of polyethylene, polypropylene, polyvinyl acetate or polyesters, for example of polyethylene terephthalate; the film thickness is preferably between 20 and 400 microns. The side strips may also consist of closed-structure nonwovens produced by various techniques (dry route, melt route, and the like), converted by deformation with heating under stress (smooth calendering), and whose weight per unit area preferably varies between 20 and 300 g/m$^2$.

The width of the added strips must be sufficient to ensure the fastening of the agrotextile to the ground. A width of between 10 and 80 cm, preferably 30 cm, can be suitable.

The joining of the sheet and of the added strips can be effected by any suitable means, especially
 by sewing,
 by gluing,
 by welding, or
 by hot-melt bonding.

The welding or heat-welding may be carried out without added material, that is to say as an autogenous technique using the action of pressure and of heat, especially by calendering; the direct heat input can be replaced by the vibrations produced by ultrasonics or by a high-frequency heat radiation. Melt-welding can also be carried out with the introduction of a glue or of a heat-fusible material which is stable under normal climatic conditions, for example in the form of an interlayer film.

In a preferred manner, the joining of the various components is performed continuously by adhesive bonding using a heat-fusible adhesive, also known as a "hot-melt" adhesive.

The agrotextile may be laid flat on the ground, on supporting timber, or on arches.

The invention will be better understood with the aid of the figures and the examples which follow, which illustrate the preferred embodiments of the product according to the invention and of its applications.

Figure 1:
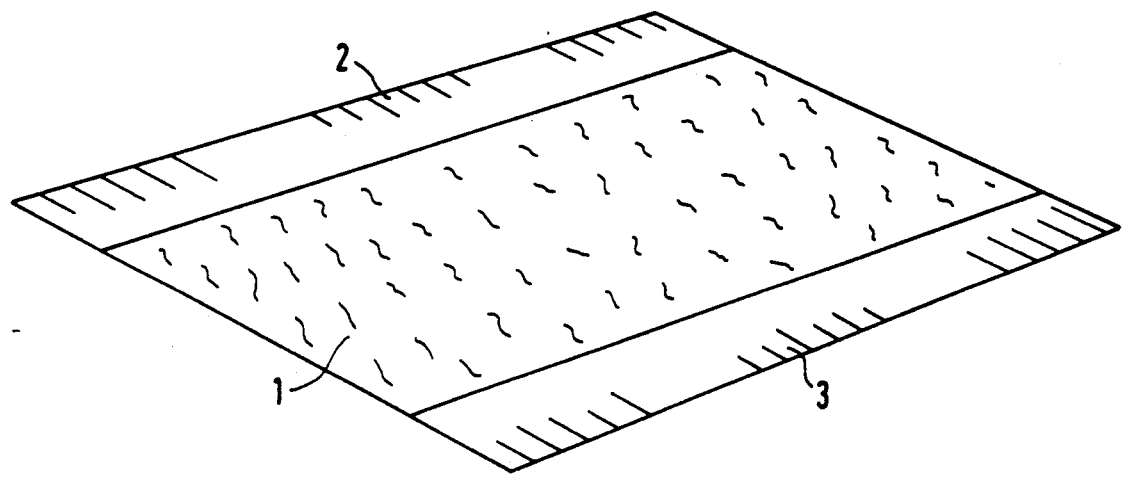
FIG. 1 is a perspective view which shows the elementary sheet (1) and then side strips (2, 3) joined into the composite agrotextile according to the invention.
Figure 2:
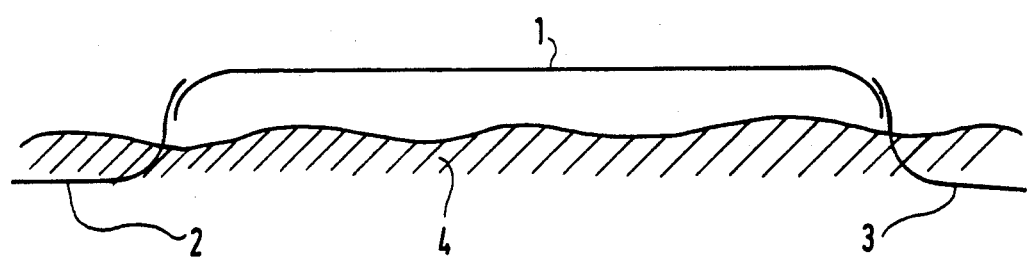
FIG. 2 is a view in vertical section which shows the composite agrotextile fastened to the ground (4) by the side strips (2, 3) which are buried therein.
Figure 3:
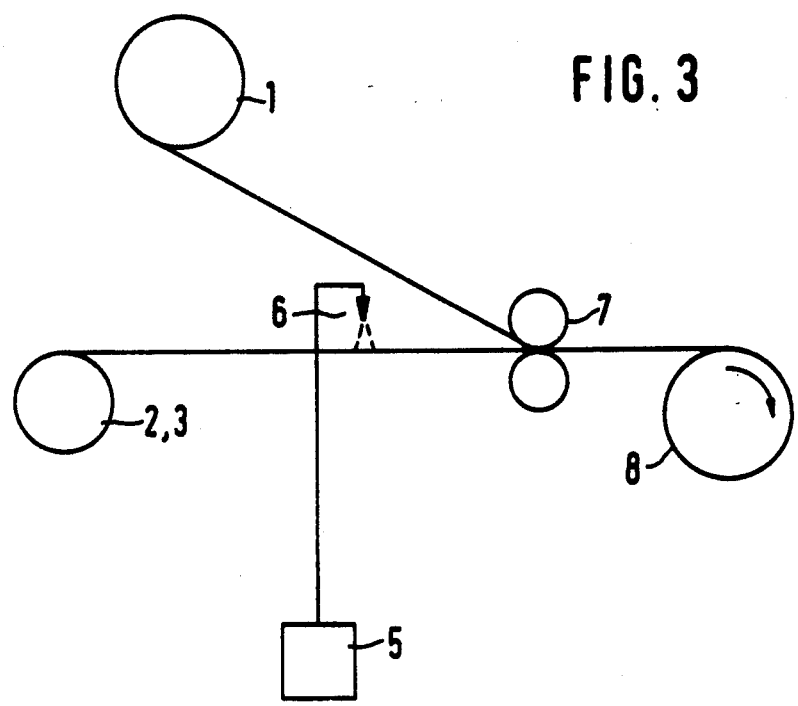
Figure 4:
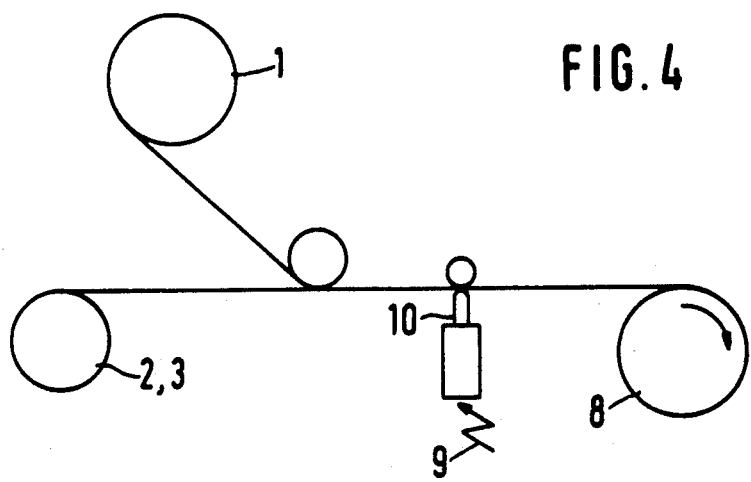

FIGS. 3 and 4 are diagrammatic view of the manufacture of the composite agrotextile. The joining of the elementary sheet (1) and of the side strips (2, 3) is performed in one case (FIG. 3) by the application of a hot-melt adhesive, based, for example, on polyolefins, ethylene/vinyl acetate copolymers, polyamides or polyesters. The adhesive must be stable, that is to say must retain its properties and thus ensure the required bonding at temperatures which are generally between −10° and +50° C. in the usual humidity conditions which can exist outside. In addition, the adhesive must be stable to UV radiation. The adhesive is deposited from a melter (5) by means of one or more application nozzles (6). The components then pass through press rolls (7) and the composite formed is reeled up (8). The joining according to FIG. 4 is performed by ultrasonics produced by an ultrasonic generator (9) can acting on the components as they pass under the sonotrode (10) (K. Floyd and V. Ozsanlav, Edana Nordic Nonwovens Symposium, Stockholm 1988, pages 120–134); the composite formed is then reeled up (8).

Figure 5:
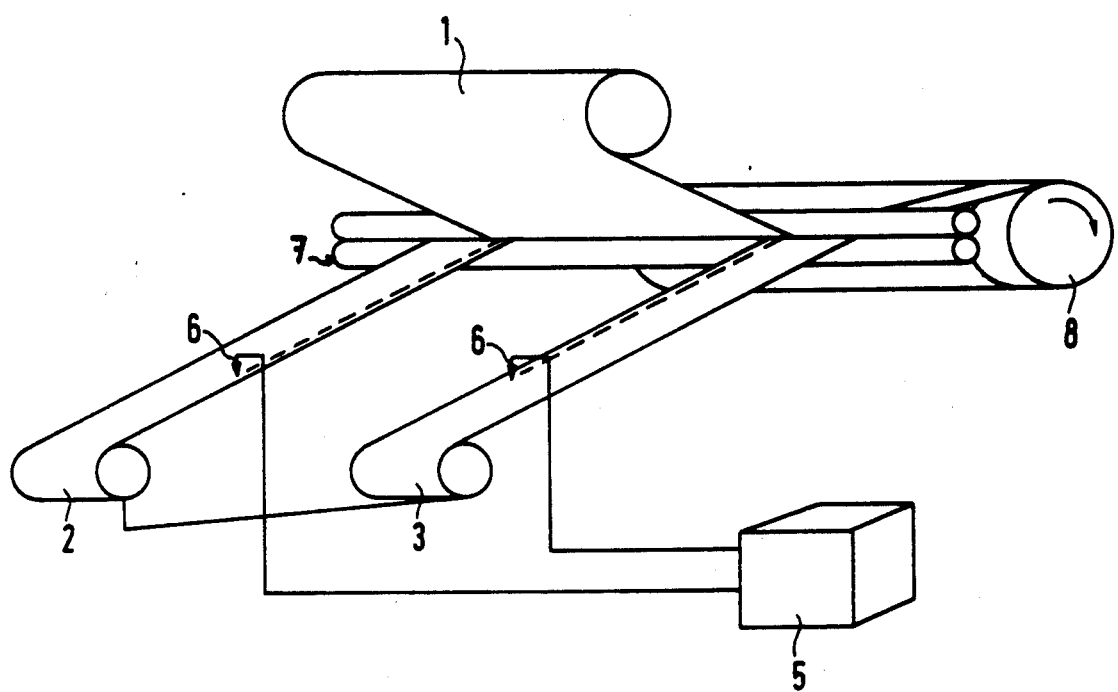

FIG. 5 is a perspective view of the manufacture according to FIG. 3, as described above.

Figure 6:
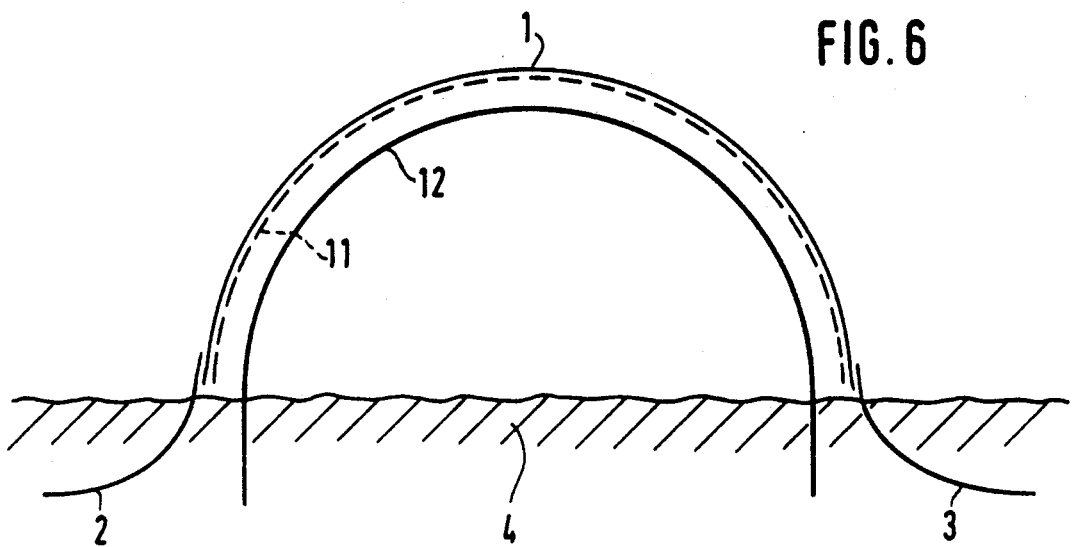
Figure 7:
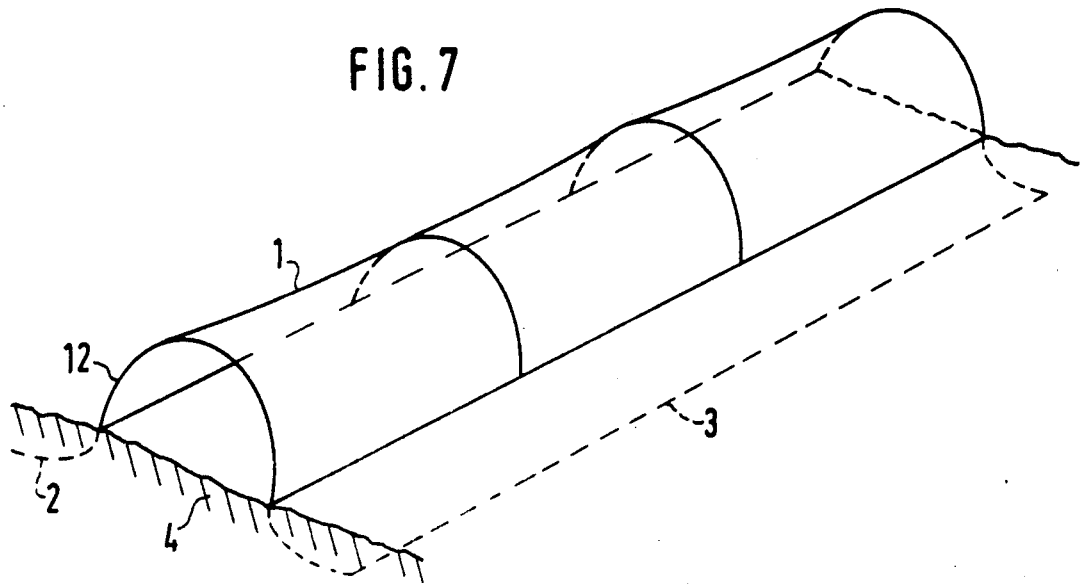

FIGS. 6 and 7 are views in vertical section and in perspective, respectively, of a tunnel according to Example 4, in which the elementary sheet (1) is strengthened by a grid (11), itself supported by hoops (12) pushed into the soil, and the side strips (2, 3) are buried in the ground (4).

Figure 8:
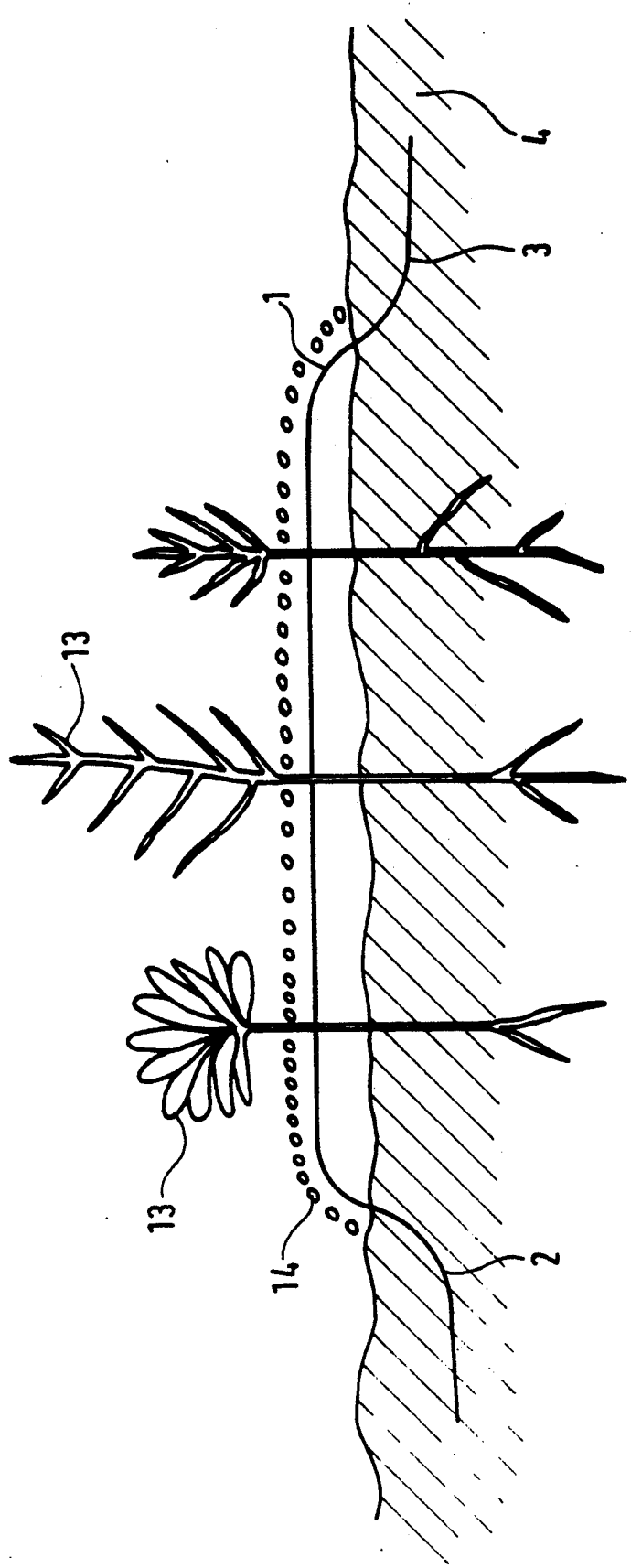

FIG. 8 is a view in vertical section of the agrotextile (1, 2, 3) employed as a mulching sheet according to Example 6, the ornamental plants and the mulch being shown as (13) and (14) respectively.

EXAMPLE 1

Joining using hot-melt adhesive

The method of joining using hot-melt adhesive is shown in FIGS. 3 and 5. A 60 g/m² nonwoven sheet and a 200-micron polyethylene film are joined by means of a hot-melt adhesive of EVA type, such as the Thermelt 2109 PEL adhesive from the TRL company, 07000 Privas, France.

The bonding speeds can vary between 1 and 150 m/min, preferably 50 m/min. The quantity of adhesive deposited by the applicator nozzles of the type of those marketed by Nordson France SA, 77201 Marne-la-Vallée, can vary between 0.6 and 5 g/linear meter of product, preferably 1.7 g/linear meter. This adhesive, whose temperature in the melter is of the order of 150° C., is first applied to the polyethylene sheet. The nonwoven sheet is applied onto the polyethylene sheet by means of press rolls at a pressure of between 10 and 50 kg/linear cm. The application of the hot-melt adhesive is preferably made in the form of a spiral bead. The width of this bead is between 2 and 20 mm, preferably 5 mm. After the composite has been reeled up and the adhesive has solidified, the strength of the adhesive bond is such that the tearing takes place in the nonwoven when a pull is applied to the film and the nonwoven in the tensometer.

EXAMPLE 2

Joining using ultrasonics

This type of joining is reserved more particularly for bonding together nonwoven sheets and added strips which are also nonwoven, but whose structure has been modified by smooth calendering (calender comprising two smooth rolls). This variant is illustrated by FIG. 4. In this case, the two components making up the composite agrotextile (nonwoven sheet and added strip) pass under a sonotrode and are joined by the technique employing ultrasonics.

For example, two nonwovens with a weight per unit area of 60 g/m² can be joined at speeds of between 10 and 80 m/minute, preferably at 40 m/minute, by means of a sonotrode powered by a 250-watt power generator. The strength of the weld is such that one of the two nonwovens ruptures when the composite is subjected to a pull in a tensometer.

EXAMPLE 3

Forcing covers

In this case, the nonwoven, placed either directly on the ground after seeding or directly on the plants, preferably consists of a sheet of continuous filaments of a thermoplastic polymer whose cohesion is produced by spot heat-bonding. The weight of the sheet varies between 8 and 50 g/m² and is preferably 17 g/m². The total width of the nonwoven sheet is between 1.5 and 15 m.

The added strip is a plastic film of polyethylene whose thickness is between 20 and 100 microns, preferably 35 microns. The width of the added strip is between 10 and 80 cm, preferably 30 cm. The added strip is buried in the ground, and this allows the agrotextile sheet to be maintained on the surface of the latter and thus to protect the crops (physical protection and microclimatic protection). The added strip allows the agrotextile sheet to be reemployed while preventing the ends buried in the ground from being torn during the removal.

EXAMPLE 4

Product intended for covering small tunnels

In this case the agrotextile sheet consists of a nonwoven sheet provided with a reinforcement: a strengthening grid is combined with the nonwoven by direct adhesive bonding (laminate) or else it may be sandwiched between two nonwoven sheets consisting of continuous filaments bonded by heat-bonding. The weight of a nonwoven sheet varies between 10 and 30 g/m², preferably 17 g/m². The width of the nonwoven sheet is between 1.50 m and 10 m, depending on the hoops to be found on the market.

The grid generally comprises threads of continuous filaments glued at the point where they join and preferably made of polyester. Its weight varies between 5 and 50 g/m², preferably 10 g/m². The added strip consists of a 20 to 300-micron, preferably 200-micron polyethylene film. This added strip is buried in the ground, while the composite nonwoven sheet is laid over the hoops which are used to form the small tunnel. At both ends of the tunnel the nonwoven sheet is gathered into conical folds directed towards the ground, so as to close the tunnel.

EXAMPLE 5

Blanching sheet

This type of product is employed for blanching vegetables, for example certain categories of lettuces, in the open field or in a forcing hall or under glass or under a tunnel. The agrotextile is laid either directly over the vegetables or over fixed supports (hoops). It is made up, for example, of two superposed nonwovens whose functions are complementary: the outer face consists of a nonwoven which is white and/or reflects light and limits heat transmission, while the nonwoven in contact with the products to be blanched is black, so as to limit light transmission as much as possible. The weight of each of the nonwoven sheets making up the product can vary between 30 and 100 g/m², preferably 40 g/m² in the case of the white (outer) nonwoven and 60 g/m² in the case of the black (inner) nonwoven.

The added strip may be a plastic film, for example of polyethylene, with a thickness of between 50 and 300 microns, preferably 200 microns. In addition to the fastening, the plastic strip buried in soil ensures sealing against light at ground level. The width of the nonwoven sheet varies between 1 and 8 m; the width of the plastic strip varies between 10 and 80 cm, preferably 30 cm.

EXAMPLE 6

Mulching sheet

This type of product is employed for mulching ornamental hedges or perennial plants (for example decorative herbs or strawberry plants). The agrotextile is laid directly on the ground and is then strengthened to permit the plants to be planted; if the plants have already been planted, the agrotextile is arranged between them at the foot. To extend the long life of the agrotextile, the latter may be covered with mulch, straw, ground tree bark or pine needles, which will protect it against degradation due to the ultraviolet rays of the sun.

The composite agrotextile according to the invention may be employed, especially, as

Floating covers

In this case, the agrotextile is laid directly on the ground (on the crops or on the seeds), the role of the floating cover being:
a) to protect the crops or the seeds against predators (birds, insects, slugs and the like);
b) to create a microclimate, that is to say
   to retain heat during the night,
   to retain moisture,
   to promote the formation of a film of water on the nonwoven (protection against frost), and
   to protect the plants against wind (windbreak effect).

Blanching sheets

In this case, the objective of the agrotextile is to promote thorough blanching of vegetables, in particular of lettuces, by limiting light transmission while protecting them against an exaggerated temperature rise.

This blanching sheet replaces various means employed at the present time (a cloche placed over the vegetables or else manual binding of each vegetable using elastic bands).

Small tunnels

In this case, the agrotextile replaces the plastic fils employed today (acting as a mini-greenhouse). The advantage of the agrotextile is its porosity to air and to water, avoiding having to open the small tunnels in very hot weather, as is the case with plastic films.

Mulching sheet

In this case, this prevents the growth of adventitious plants and/or limits the decomposition of the mulching materials.

What is claimed is:

1. A composite agrotextile, comprising an elementary porous sheet which is permeable to air and water having a woven, knitted or nonwoven structure and a substantially rectangular shape with a direction of elongation, said elementary porous sheet having side strips joined thereto at least along said direction of elongation, said side strips being produced from a flexible and smooth sheet of plastic of closed structure having greater elasticity than said elementary porous sheet.

2. The composite agrotextile as claimed in claim 1, wherein said elementary porous sheet comprises a single sheet of material.

3. The composite agrotextile as claimed in claim 1, wherein said elementary porous sheet comprises a sandwich or laminated composite material.

4. The composite agrotextile as claimed in claim 1, wherein said elementary porous sheet comprises a combination of two or more sheets of different materials having different characteristics.

5. The composite agrotextile as claimed in claim 1, wherein said elementary porous sheet is made of a nonwoven sheet of continuous filaments of a thermoplastic copolymer.

6. The composite agrotextile as claim in claim 5, wherein said thermoplastic polymer is comprised of polyolefin or polyester.

7. The composite agrotextile as claimed in claim 5, wherein said nonwoven sheet is obtained by spunbond process and has a cohesion produced by spot heat-bonding.

8. The composite agrotextile as claimed in claim 1, wherein said elementary porous sheet is between 5 and 200 g/m$^2$ in weight.

9. The composite agrotextile as claimed in claim 1, wherein said side strips are produced from a plastic selected from the group consisting of polypropylene, polyethylene, polyvinyl acetate and polyester.

10. The composite agrotextile as claimed in claim 1, wherein said side strips consist of a nonwoven closed structure obtained by deformation with heating under stress.

11. The composite agrotextile as claimed in claim 1, wherein said elementary porous sheet and said side strips are joined by sewing, gluing, welding or hot-melt bonding.

12. The composite agrotextile as claimed in claim 11, wherein said elementary porous sheet and said side strips are joined in a continuous process by adhesive bonding by means of a hot-melt adhesive stable in normal climatic conditions.

* * * * *